United States Patent [19]
Schultz et al.

[11] 3,899,383
[45] Aug. 12, 1975

[54] STRIP APPLYING DEVICE

[75] Inventors: Thomas E. Schultz, Roseville; Peter W. Schuchardt, May Twp., both of Minn.

[73] Assignee: Minnesota Mining and Manufacturing Company, St. Paul, Minn.

[22] Filed: Mar. 15, 1974

[21] Appl. No.: 451,684

[52] U.S. Cl. .......... 156/394; 152/353; 152/DIG. 12; 156/95; 156/123; 156/130; 226/104; 226/106; 242/182
[51] Int. Cl. . B29h 17/00; B60c 13/00; G11b 15/58
[58] Field of Search ....... 156/96, 95, 110, 116, 117, 156/121, 123, 130, 394, 397, 404, 405, 187, 194, 350, 353, 360, 361, 366, 381, 382, 446; 152/353, DIG. 12; 226/104–108, 118; 242/182–185

[56] References Cited
UNITED STATES PATENTS

| | | | |
|---|---|---|---|
| 2,575,887 | 11/1951 | Nitchie | 156/361 |
| 2,756,891 | 7/1956 | Hill | 156/353 |
| 3,354,318 | 11/1967 | Wahlstrom | 242/184 |
| 3,382,908 | 5/1968 | Palmquist et al. | 152/353 |
| 3,427,215 | 2/1969 | Crocker | 156/116 |
| 3,595,724 | 7/1971 | Leblond | 156/405 |
| 3,728,181 | 4/1973 | Simmons | 156/96 |
| 3,787,263 | 1/1974 | Yonekawa | 156/446 |

Primary Examiner—Clifton B. Cosby
Assistant Examiner—John E. Kittle
Attorney, Agent, or Firm—Alexander, Sell, Steldt & DeLaHunt

[57] ABSTRACT

A device including two heads which may be positioned at an applying station to apply parallel lengths of elastic reflex-light reflective strip material in an unstretched condition around the circular outer surface of a tire casing rotated past the station. Each head includes a vacuum column which supports a supply length of the strip material adjacent the applying station so that the strip material at the applying station will be under essentially no tension; and a tape drive mechanism which, as the strip material is applied to a tire casing, removes a protective liner from the strip material and drives the strip material toward the vacuum column at a variable rate to maintain a supply length of the strip material in the vacuum column. The device also includes means for sensing the end of the applied length of strip material on the endless surface of the tire casing as it returns toward the applying station, and for severing the strip material in a predetermined position with respect thereto to provide a predetermined overlap of the ends of the strip material around the tire casing.

10 Claims, 9 Drawing Figures

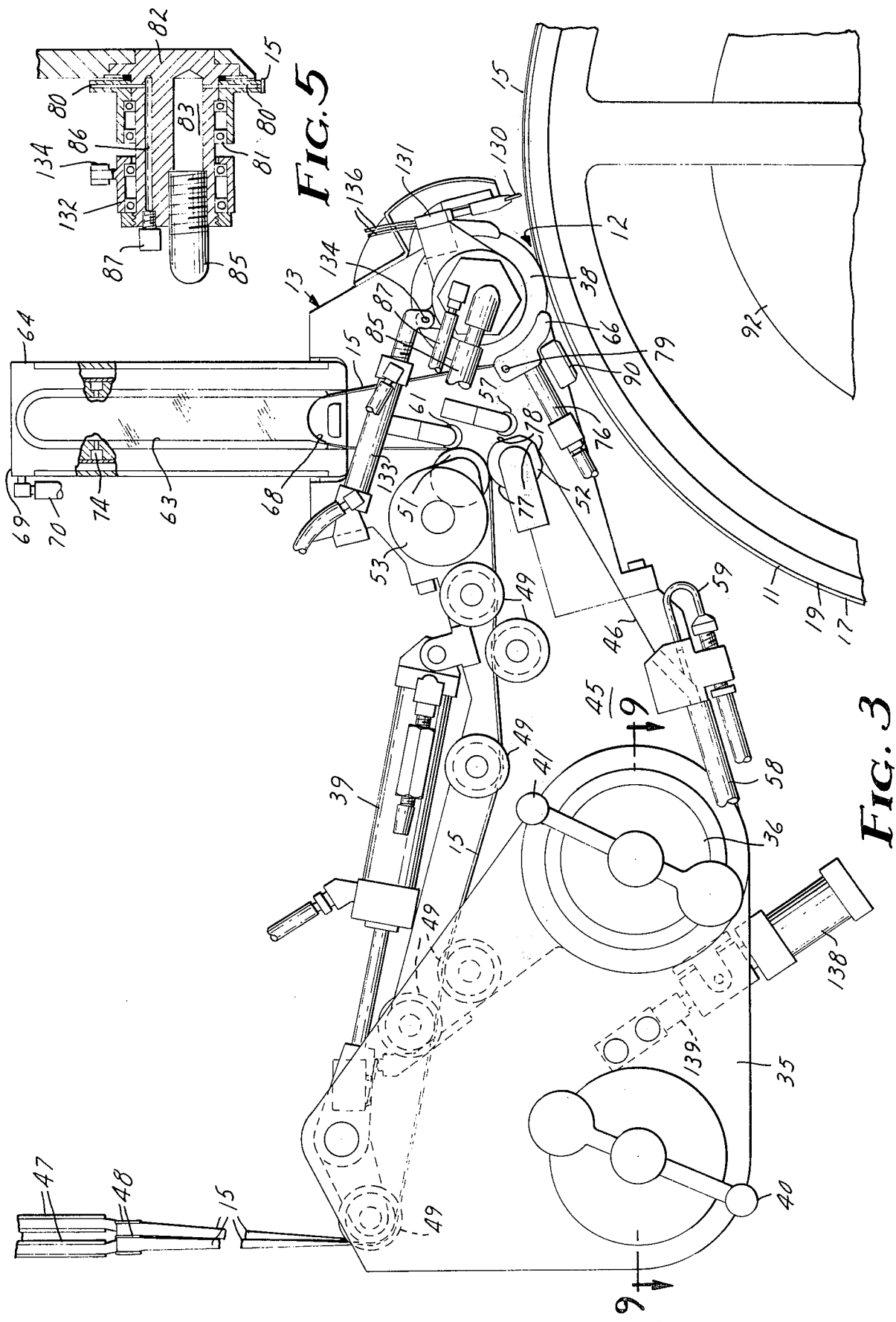

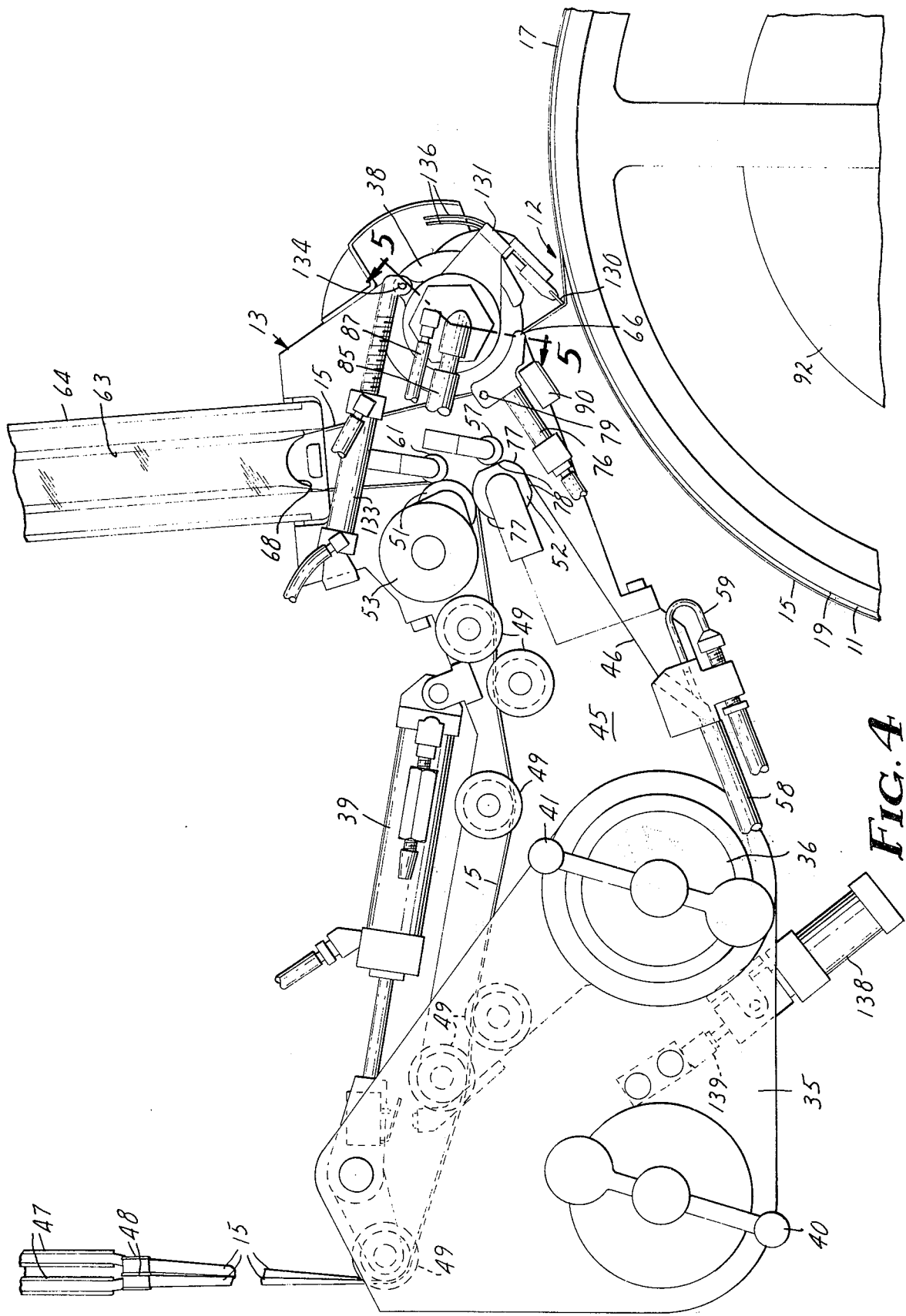

STRIP APPLYING DEVICE

BACKGROUND OF THE INVENTION

The present invention relates to devices for applying strips of material to a surface, and in one aspect to devices for applying strips of reflex-light reflective material around tire casings.

Tires including reflex-light reflective strips around their sidewalls (as taught in U.S. Pat. No. 3,382,908) have found particular acceptance for use on bicycles and motorcycles to provide a measure of safety when the cycle is operated after dark. Such tires are typically constructed by adhering parallel strips of an uncured elastomer (such as neoprene rubber) supporting a layer of reflex-reflective elements to the solvent tackified flat outer surface of an unvulcanized tire casing. The tire casing is then vulcanized in a tire mold to form a completed tire having a U-shaped cross section tread, brand and size information embossed on its sidewall and the strips permanently incorporated in its sidewalls.

The only known prior art device for applying such strip material to an unvulcanized tire casing is the device illustrated in Drawing No. TR-175 which is available from the Special Enterprises Department of Minnesota Mining and Manufacturing Company, Saint Paul, Minnesota. This device includes two parallel heads each manually movable into engagement with a casing at a fixed applying station defined along means for rotating the tire casing (i.e., a tire building wheel). These heads each include a rotatably mounted applying wheel, means for defining a path for a length of the strip material from a supply reel along a predetermined path to a portion of the path partially around the periphery of the applying wheel, and means along the path for separating a protective liner from the strip material. A partial vacuum is provided in openings around the periphery of the applying wheel to aid in tracking the strip material along the periphery of the applying wheel, and to support an end of the strip material thereon when the head is not at the applying station. When the head is manually moved to the applying station, the applying wheel presses and adheres the strip material against the tire casing so that movement of the tire casing pulls the strip from the supply roll and applies it around the casing.

While this device is serviceable, it has a potential for stretching the applied strip material. If such stretching exceeds 3 to 5 percent, it can cause partial release of the reflex-reflective material and cracking of the strip material when the tire casing is vulcanized. Also an operator using this device has to manually sever the strip material after it is applied around a tire casing, so that obtaining a desired relative position between the ends of the applied strip is time consuming, tedious, and highly dependent on the care taken by the operator.

SUMMARY OF THE INVENTION

The present invention provides a highly automated device for applying elastic strip material to a surface without causing any perceptible stretch in the applied strip material. The device is particularly adapted for applying parallel strips of elastic reflex-light reflective material to tire casings. The device provides precise relative positioning for the ends of strips applied around an endless surface which, for a tire casing, will consistently provide a desired appearance for the seam in the strip material after the tire is vulcanized.

According to the present invention there is provided a device of the type previously described for applying a strip of reflex-reflective material to an unvulcanized tire casing. Each head of the device includes a vacuum column which provides means for supporting a U-shaped supply length of the strip material adjacent the applying wheel, and a drive mechanism which, as the strip material is being applied around a tire casing, drives the strip material toward the vacuum column at a variable rate to maintain a supply length of the strip material in the vacuum column. Thus the tension required to move the strip material under the applying wheel is little more than that required to move the U-shaped supply length in the vacuum column, so that no perceptible stretch is introduced in the applied strip material.

In the device according to the present invention, the means for separating the protective liner from the strip material and the drive mechanism are partially combined, and have a novel design which provides positive separation by driving the strip material and liner both before and after separation while providing means for restricting the accumulation of slack in either the strip material or liner between the points of driving engagement.

Also the device includes means for sensing the end of the strip material on the endless surface of the tire casing as it returns toward the applying station, and for severing the strip at a predetermined position with respect thereto to provide a predetermined relationship between the ends of the strip independent of the length of the applied strip.

BRIEF DESCRIPTION OF THE DRAWING

The present invention will be further described with reference to the accompanying drawing wherein like numbers refer to like parts in the several views, and wherein:

FIG. 3 is an enlarged fragmentary view of the device of FIG. 1, illustrated with the strip applying heads in an applying position pressing strips of material against the tire casing;

FIG. 4 is an enlarged fragmentary view partially in section of the device of FIG. 1, illustrated with the head in a position at which strip material applied around a tire casing is severed from the supply of strip material on the device;

FIG. 5 is an enlarged sectional view taken approximately along line 5—5 of FIG. 4;

DESCRIPTION OF THE PREFERRED EMBODIMENT

Figures 1, 8:
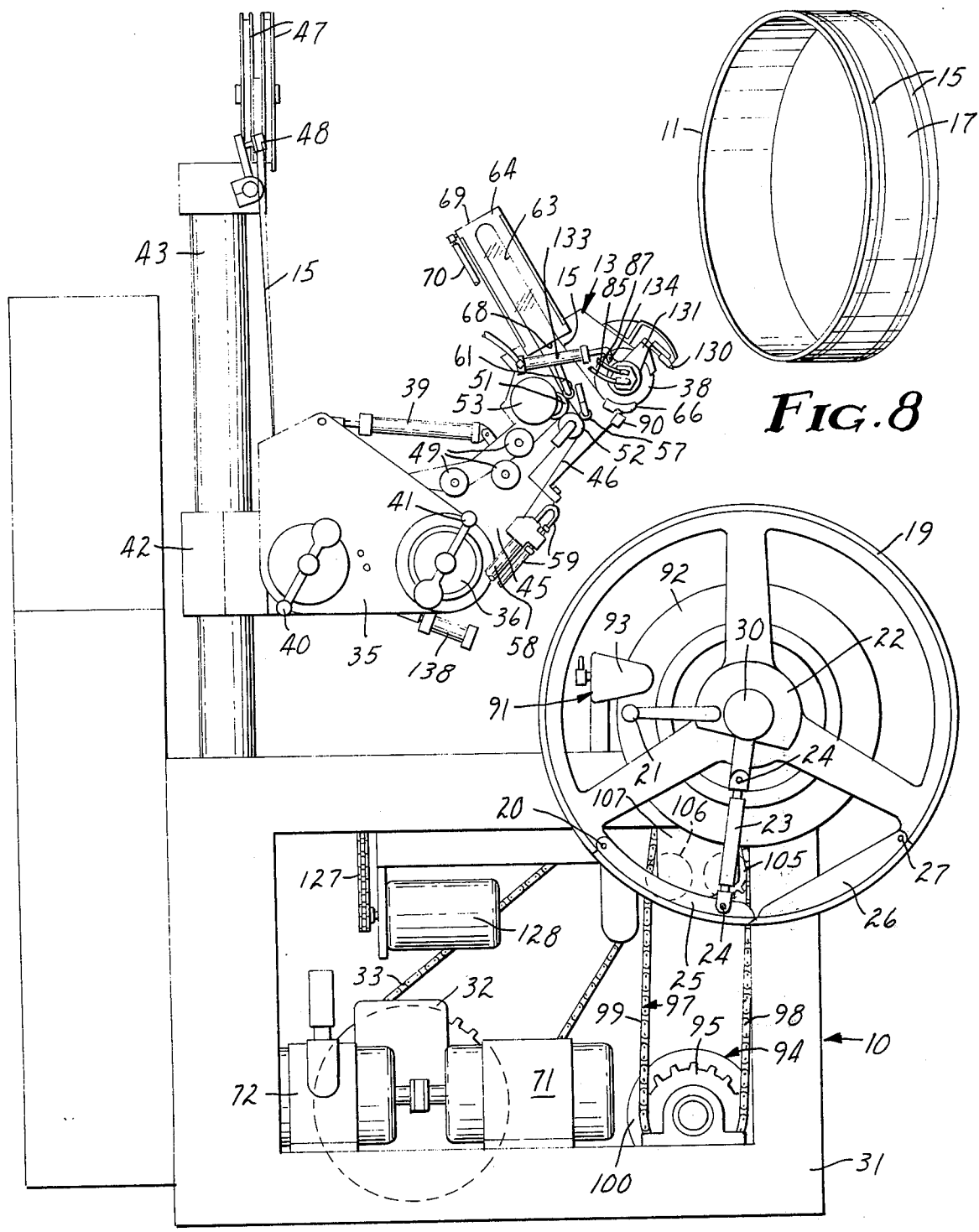
FIG. 1 is a vertical side view of a device according to the present invention, illustrated with its strip applying heads separated from a tire casing mounted on the device.
FIG. 8 is a perspective view of a tire casing having strip material applied thereto by the machine of FIG. 1.

Referring now to the drawing there is illustrated a device or machine according to the present invention generally designated by the numeral 10.

The device 10 includes means for driving an unvulcanized tire casing 11 past an applying station 12, and first and second spaced strip applying heads 13 and 14 adapted for applying spaced lengths of reflex-reflective strip material 15 to the tire casing 11 at the applying station 12.

As illustrated the tire casing 11 to which the strip material 15 is applied is an unvulcanized bicycle tire, comprising a continuous belt-like length of tire cord and natural rubber, having at each edge an inwardly projecting bead and a generally flat continuous outer surface 17 which will be formed into the tread and sidewals of the bicycle tire in the vulcanizing process. The casing 11 is supported on a tire-building wheel 19 of a well known type, which has a groove around its periphery adapted to receive and support the tire casing 11 in a taut condition. An over center mechanism operated by a handle 21 fixed to a relatively rotatable collar 22 at the hub of the tire building wheel 19 can be released by rotating the handle 21 to pivot an arm 23 about pins 24 and pull a section 25 of the rim of the wheel 19 about a pin 20 toward the center of the wheel 19. This allows a second section 26 of the rim of the wheel 19 normally supported by the first section 25 to swing toward the center of the wheel 19 about a pin 27. Such movement of the sections 25 and 26 allows a tire casing to be placed on or removed from the wheel 19.

The tire building wheel 19 is rotatably mounted via a shaft 30 on a frame 31 for the machine 10, and may be rotated by a variable speed gear reduced main drive motor 32 coupled to the shaft 30 by a chain and sprocket drive 33 and a pneumatic clutch 34. While the tire building wheel 19 is illustrated as means for supporting a tire for movement past the applying station, a tire builder of the commercially available "Mono-Band" type (i.e., two spaced axially parallel wheels between which the tire is tensioned) could also be used to perform this function.

The strip applying heads 13 and 14 are each mounted on a frame portion 35 for pivotal motion on a shaft 36 between a loading position spaced from the tire casing 11 on the wheel 19, and an applying position with an applying wheel 38 pressing the strip into engagement with the casing 11. The weight of the heads 13 and 14 provides means for biasing them toward their applying positions, and an air operated cylinder 39 operated by control means, as will later be explained, is pivotally mounted between each head 13 or 14 and the frame portion 35 to provide means for moving the head 13 or 14 to its loading position.

The contact points of the strips of material on the applying wheels 38 with respect to the tire building wheel 19 are adjustable by means including a first adjustment device which may be operated by rotating a crank 40 to move the frame portion 35, the shaft 36, and both strip applying heads 13 and 14 axially of the tire building wheel 19; and a second adjustment drive in the shaft 36 about which the strip applying heads 13 and 14 are pivoted. The second adjustment drive is operated by rotating a crank 41 which will adjust the spacing between the strip applying heads 13 and 14 by moving the second head 14 axially of the tire building wheel 19 relative to the first head 13. Additionally, the position of the frame portion 35 may be adjusted vertically to change the position of the applying station 12 around the periphery of the tire building wheel 19 by releasing a clamping collar 42 and sliding it on a column 43; the collar 42 and column 43 being of the type conventionally used to adjust the work table on a drill press.

Figure 2:
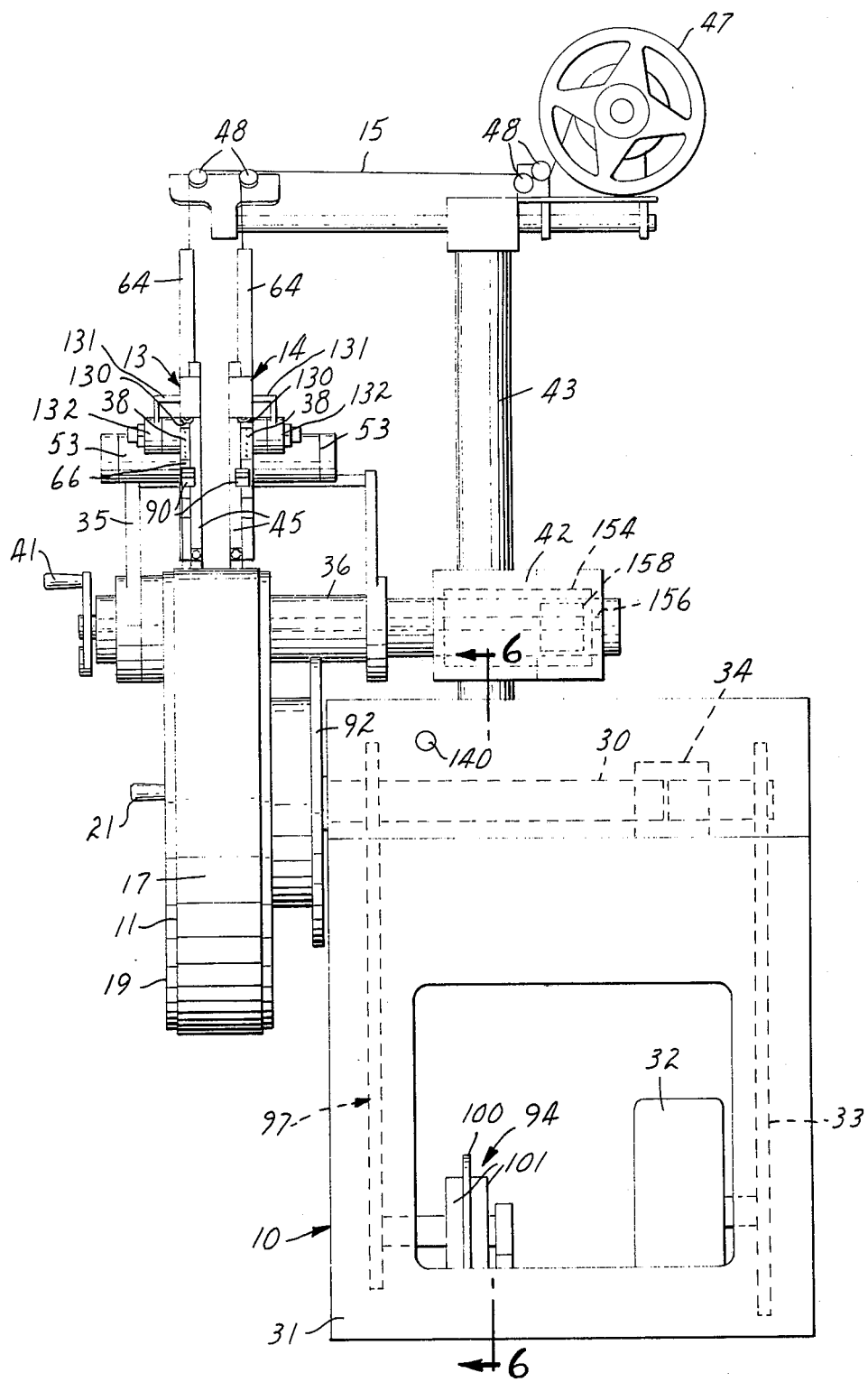
FIG. 2 is a front view of the device of FIG. 1.
Figure 9:
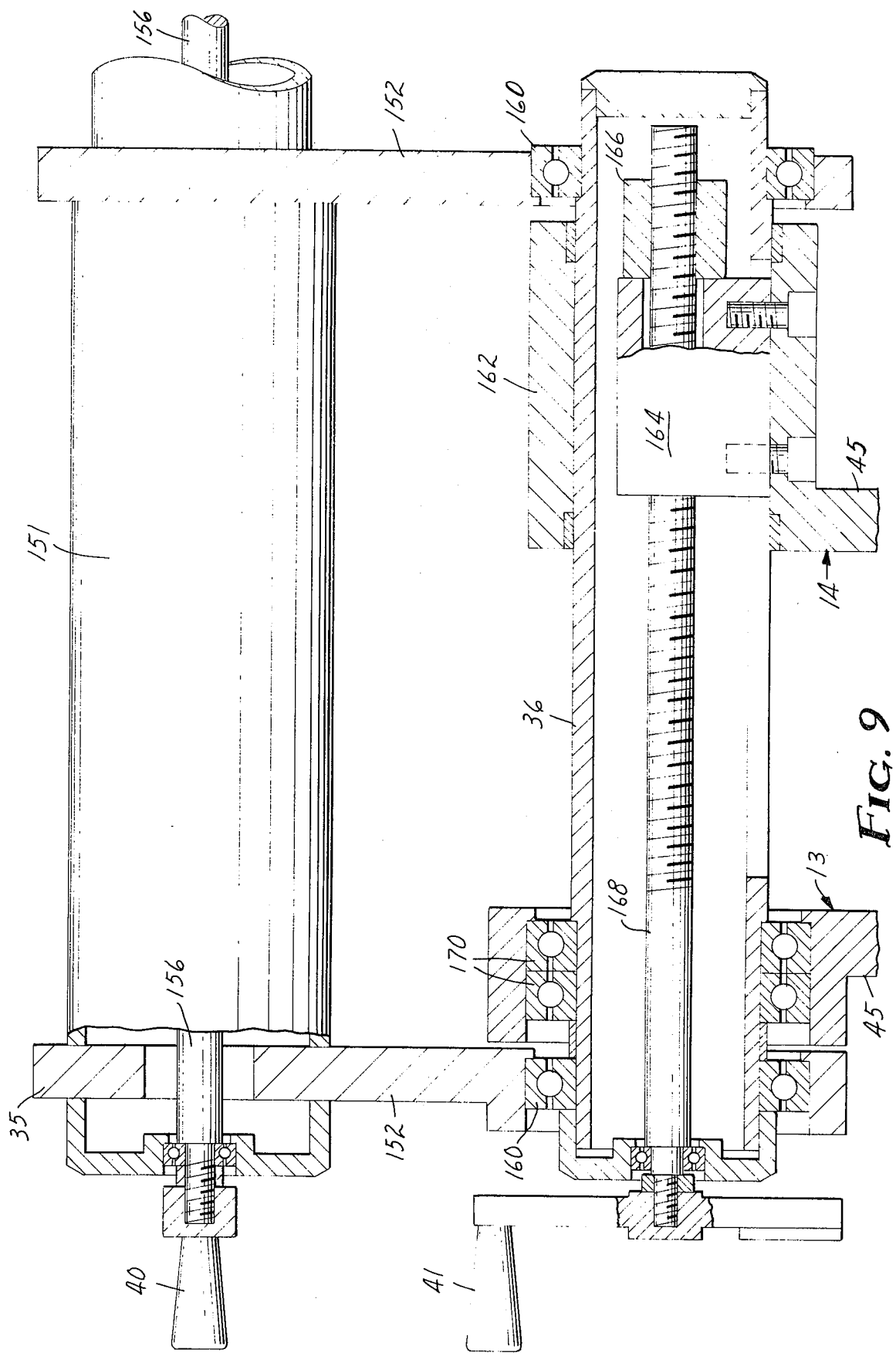
FIG. 9 is an enlarged fragmentary sectional view taken approximately along line 9—9 of FIG. 3.

As is best seen in FIGS. 2 and 9, the first adjusting device includes a hollow cylinder 151 on one end of which are fixed spaced side plates 152 included in the frame portion 35. The opposite end of the cylinder 150 is mounted via bearings 154 in the collar 42 for axial sliding motion in a direction axially parallel with the shaft 30. The crank 40 is fixed at one end of a shaft 156 rotatably mounted at the center of the cylinder 150, and restrained against axial movement relative thereto. The shaft 156 has a threaded end opposite the crank 40 in engagement with a nut 158 fixed in the collar 42 so that rotation of the crank 40 in either direction will produce movement of the frame portion 35 and both strip applying heads 13 and 14 axially of the tire building wheel 19.

The second adjusting device, best seen in FIG. 9, includes the shaft 36 which is rotatably mounted by bearings 160 within the side plates 152. The second strip applying head 14 includes a collar 162 axially slidable along the shaft 36 but fixed against rotation relative thereto by a block 164 extending inwardly through an axial slot in the wall of the shaft 36. A nut 166 is attached to the block 164 and a rod 168 coaxially positioned within the shaft 36 has one end in threaded engagement through the nut 166. The crank 41 is fixed on the opposite end of the rod 168 and the rod 168 is restrained against axial movement. Thus rotation of the crank 41 will produce movement of the nut 166 and thus the second strip applying head 14 axially along the shaft 36, while in any of its possible positions axially of the shaft 36 the second strip applying head 14 may be rotated with the shaft 36 within the bearings 160. The first strip applying head 13 is rotatable on bearings 170 about the shaft 36. The bearings 170 are in a fixed location axially of the shaft 36, so that rotation of the crank 41 provides movement of the second strip applying head 14 relative to the first strip applying head 13.

The strip applying heads are arranged as mirror images of each other except for their manner of mounting around the shaft 36 as has already been described.

As is best seen in FIG. 3, each strip applying head 13 or 14 includes a rigid support member or plate 45, means for defining a path for the strip material 15 along the plate 45 including a predetermined path portion relative to the plate 45 defined partially around the periphery of the applying wheel 38, and means along the path for separating a protective liner 46 from the strip material 15 and for limiting the tension in the strip material 15 at the applying station 12.

For each strip applying head 13 or 14, the machine 10 includes a reel 47 for supporting a supply length of the strip material 15 to which is adhered the protective liner 46, and flanged, rotatable guide rollers 48 which guide the strip material 15 and adhered liner 46 from the reel 47 onto the head 13 or 14. On each strip applying head 13 or 14 the strip material 15 and adhered liner 46 extend along a path defined by a series of flanged rotatable guide rollers 49 and the nip between a pair of rollers 51 and 52. Each of the rollers 51 and 52 is individually driven by a motor 53 through a gear train in the frame (not shown) to provide a portion of drive means for advancing the strip material along the path. At the nipping rollers 51 and 52 the liner 46 is separated from the strip material 15 and extends around the periphery of the second nipping roller 52, under an idler roller 57 and into a liner discharge tube 58. A jet of air is directed from a pipe 59 through the discharge tube 58 to provide a light constant tension on the separated liner 46, and to discharge the liner 46 from an outlet end of the tube 58. From the nip between the rollers 51 and 52 the strip material 15 extends partially around the periphery of the first nipping roller 51 and under an idler roller 61, after which a U-shaped supply length of the strip material 15 extends into a chamber 63 in a vacuum column 64. From the chamber 63 the strip material 15 extends along a pivotal guide shoe 66 and the path portion relative to the plate 45 along the periphery of the applying wheel 38.

The means for limiting the tension in the strip material 15 at the applying station 12 includes a control means for the motor 53 which is responsive to the position of a U-shaped supply length of strip material 15 and operates the motor 53 at a rate sufficient to maintain a U-shaped supply length of the strip material 15 within the chamber 63 while the strip material 15 is being applied to a tire casing.

The chamber 63 in the vacuum column 64 has an open end 68 through which the U-shaped supply length of strip material projects into the chamber 63, an opposite closed end 69, and a width such that a U-shaped supply length of strip material 15 will form a loose fitting air seal between its open and closed ends 68 and 69. The closed end 69 of the chamber 63 communicates through a tube 70 with the intake side of a motor 71 driven regulated vacuum pump 72 to create a sub atomspheric pressure at the closed end 69 of the chamber 63 so that atmospheric pressure will support the U-shaped supply length of strip material 15 in the chamber 63. One side wall of the vacuum column 64 is transparent to allow an operator to view the position of a supply length of strip material 15 therein. A plurality of photoelectric sensors 74 are spaced along one edge wall of the vacuum column 64 each opposite a light source. A U-shaped supply length of strip material in the chamber 63 will block light from a number of the sensors 74, which number depends on the length of the U-shaped supply length. The control means for the strip drive motor 53 is a conventional summing circuit which increases the driving speed of the strip drive motor 53 when an increasing number of the sensors 74 are activated by receiving light, thus maintaining a supply length of the strip material 15 in the vacuum column 64 from which strip material 15 can be removed with a very light tension at the applying wheel 38.

The means for driving the strip material along the path and for separating the liner from the strip material provide driving engagement with the strip material 15 and liner 46 both before and after separation to insure such separation even when the liner 46 is strongly adhered to the strip material 15, and includes means for restricting the accumulation of slack in either the strip material 15 or liner 46 between the points of driving engagement.

The roller 51 has a cylindrical peripheral surface. The roller 52 has cylindrical peripheral surface portions 77 which when positioned at the nip between the rollers 51 and 52, afford driving contact of the rollers 51 and 52 on the opposite surfaces of the lined strip material 46/15. The idler roller 61 is spring biased to press the strip material 15 against the roller 51 and provide driving contact therebetween, and the roller 57 is spring biased and spaced from the circular peripheral surface portions 77 of the roller 52 to press the liner 46 into driving engagement therewith. The roller 52 is formed with two flatted peripheral surface portions 78 disposed at an angle to each other such that at one position to which the roller 52 can be rotated (called an "adjust" position herein) one flatted surface portion 78 will be at the nip between the rollers 51 and 52 while the other flatted surface portion 78 will be adjacent the idler roller 57.

When one of the flatted surface portions 78 is at the nip between the rollers 51 and 52, the lined strip material 46/15 can slip relative to the rollers 51 and 52 under the influence of tension in the supply length of strip material from the reel 47. The movement of the idler roller 57 toward the drive roller 52 is limited so that when one of the flatted surface portions 78 of the drive roller 52 is adjacent thereto, the liner may slide longitudinally through the nip therebetween. Thus as the roller 52 is driven past the "adjust" position, the strip material 15 is driven at the idler roller 61 while the lined strip material 46/15 and liner 46 can slip to remove slack in the liner 46 and strip material 15 on the rollers 51 and 52. The aforementioned flatted configuration of the roller 52 has been found to relieve a problem of slack accumulation, (particularly in the strip material 15) which occurred in the strip material 15 and liner 46 between the idler rollers 61 and 57 and nip between the rollers 51 and 52 when a circular roller was used in place of the roller 52. Such slack accumulation prevented positive separation of the liner 46 and strip material 46 and eventually jammed the drive mechansim.

Each tape applying head 13 or 14 also includes vacuum means which, when the head 13 or 14 is at its loading position separated from a tire casing on the tire building wheel 19, will support the end of the strip material at a predetermined position along the periphery of the wheel so that the end will be pressed against the tire casing when the head 13 or 14 is moved to its applying position; and means for restricting movement of the end of the strip material along the path when the head 13 or 14 is not in its applying position.

The guide shoe 66 is mounted on a pin 79 for pivotal motion between a release position closely spaced from the applying wheel to afford movement of the strip material therebetween and to guide the strip material onto the wheel; and a clamping position clamping the strip material against the applying wheel 38 to prevent movement thereof. A spring return air operated cylinder 76 is coupled between the plate 45 and guide shoe 66 is operable by the control system of the device 10 to move the guide shoe 66 between its release and clamping positions.

As is most clearly illustrated in FIG. 5, the applying wheel 38 has a plurality of spaced radial openings 80 through its periphery. The wheel is rotatably mounted by bearings 81 on a hub 82 having vacuum passageways 83 which communicate between a tube 85 connected to the inlet side of the vacuum pump 72 and those radial openings 80 in the applying wheel 38 which are adjacent the path portion for the strip material 15 along the periphery of the applying wheel 38. Thus when the strip applying head 13 or 14 is separated from a tire casing the end of the strip material 15 which projects beyond the guide shoe 66 will be supported by atmospheric air pressure along the periphery of the applying wheel 38 in a proper position for subsequent engagement with a tire casing on the wheel 19.

The hub 82 is also formed with pressure passageways 86 which communicate between an air line 87 coupled to a source of air under pressure (not shown) and certain radial openings 80 in the applying wheel 38 which are adjacent a circumferential portion of the hub 82 spaced from the path portion for the strip material 15. During operation of the device 10 the air under pressure will be expelled through the openings 80 as they rotate past the pressure passageways 86 so that foreign objects, such as talc powder or detackifying agents used in the manufacturing of tires, will be expelled from the openings. This insures that the openings 80 will not become clogged and allow the end of the strip material 15 to drop way from the path portion along the periphery of the applying wheel 38 when the head 13 or 14 is separated from a tire casing.

The device 10 also includes novel means for sensing the ends of the applied lengths of strip material on a tire casing as they return toward the applying station 12 and for severing the strip material 15 in a predetermined position with respect to the applying station 12 to provide a predetermined relationship between the ends of the lengths of strip material 15 applied around the tire casing. This means includes means for stopping rotation of the tire building wheel 19 when the end of the strip material 15 is sensed, indexing means for subsequently advancing the tire building wheel 19 a precise predetermined amount, and a severing means for then severing the strip material 15 at a predetermined position with respect to the applying station 12.

A photoelectric sensor 90 is mounted on the first strip applying head 13 in a position so that the end of a strip of material adhered to a tire casing will pass adjacent the sensor 90 as the end of the strip material 15 is rotated back toward the applying station 12. Upon receipt of a signal that the end of the strip material 15 applied to a tire casing has passed adjacent the sensor 90, the control system for the machine deactivates the pneumatic clutch 34 to disconnect the motor 32 from the tire building wheel 19, and actuates a first disk brake assembly 91 for instantly stopping rotation of the tire building wheel 19. The first disk brake assembly 91 is of a conventional type, including a circular plate 92 coaxially attached to the drive shaft 30 for the tire building wheel 19, with an edge portion of the plate 92 positioned in the jaws of an air pressure actuated spring return clamping mechanism 93 mounted on the frame 31. The clamping mechanism 93 may be actuated to frictionally engage and stop movement of the plate 92 and thus the tire building wheel 19.

Figures 6, 7:
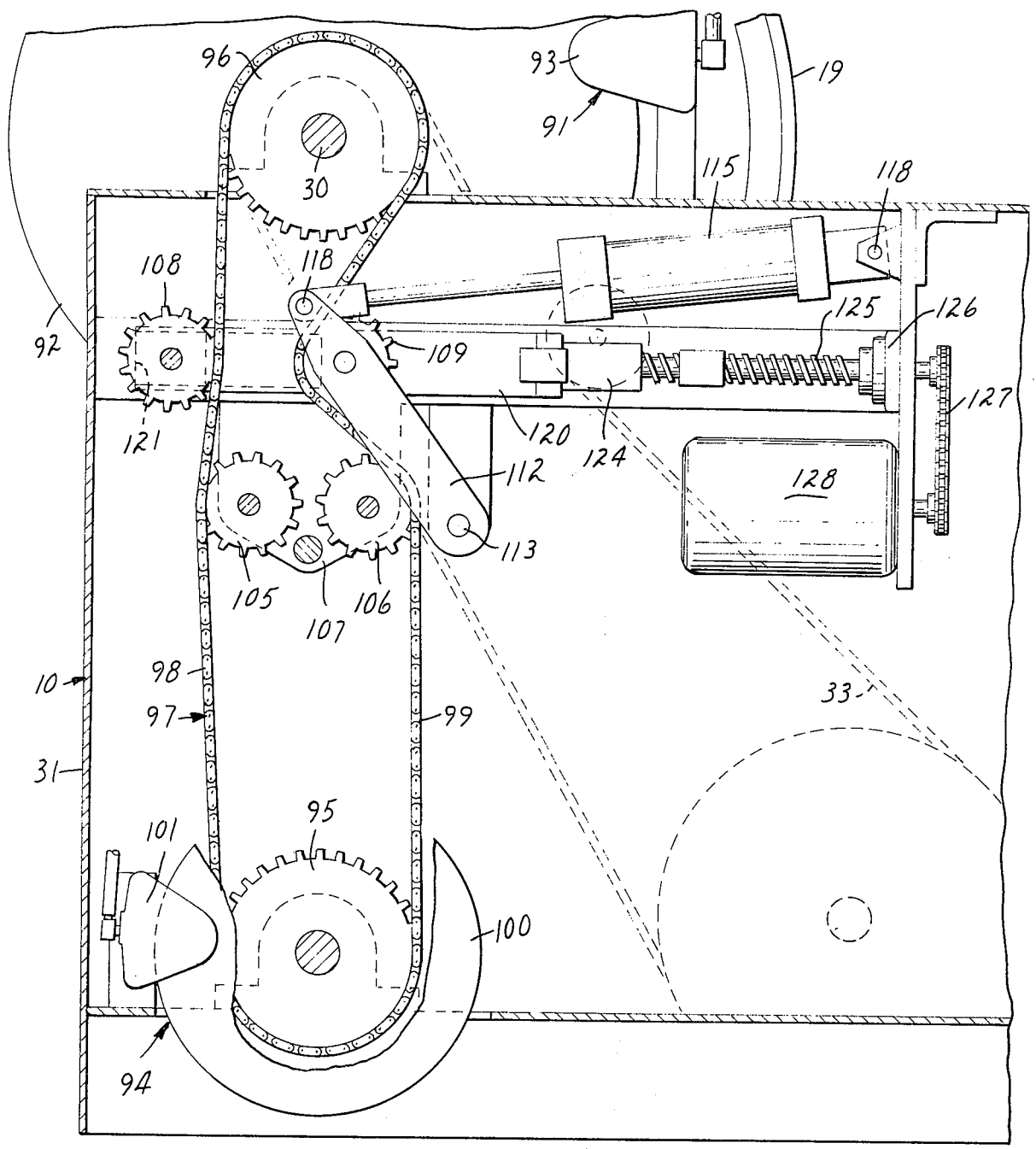
FIG. 6 is an enlarged fragmentary sectional view taken approximately along line 6—6 of FIG. 2 illustrating an indexing mechanism in a normal position, and illustrating in phantom a drive mechanism for the device which is located to the right of line 6—6 in FIG. 2.
FIG. 7 is an enlarged fragmentary sectional view taken approximately along line 6—6 of FIG. 2, illustrating the indexing mechanism in a cut-off position.

As is best seen in FIG. 6 the indexing means includes a second disk brake assembly 94 coupled to the shaft 30 via a sprocket 95 rotatably mounted on the frame 31, a sprocket 96 fixed to the shaft 30, and a roller chain 97 including first and second lengths of chain 98 and 99 extending between the sprockets 95 and 96. The second disk brake assembly 94 is similar to the first brake assembly 91, and includes a circular plate 100 coaxially fixed to the sprocket 95 and having a portion of the plate 100 positioned in the jaws of an air pressure actuated spring return clamping mechanism 101 mounted on the frame 31. After the sensor has detected the end of the strip material 15 and the control system has activated the first disk brake assembly 91 and uncoupled the pneumatic clutch 34, the control circuit releases the first disk brake assembly 91 while activating the second disk brake assembly 94. The control system then activates an advancing mechanism for lengthening the first length of chain 98 by a predetermined amount while shortening the second length of chain 99 so that the sprocket 96, tire building wheel 19, and the tire casing on the tire building wheel 19 is rotated through a predetermined angle to a position at which the strip material 15 is severed by the severing means.

The first and second lengths of chain 98 and 99 are spaced by the outer peripheries of a pair of spacing idler sprockets 105 and 106 rotatably mounted on a plate 107 rigidly supported on the frame 31. The lengths of chain 98 and 99 also pass between the adjacent peripheral surfaces of a tensioning sprocket 108 and an adjusting sprocket 109, which adjacent surfaces are spaced by a distance about half the distance between the outer surface of the idler sprockets 105 and 106.

An arm 112 is pivotally mounted on the frame 31 at a pin 113 and rotatably supports the tensioning sprocket 109 at its end opposite the pin 113. The arm 112 is biased in a direction to press the tensioning sprocket 109 into engagement with the second length of chain 99 by a constant force means comprising an air cylinder 115 which has its piston and housing pivotably attached at pins 118 between the frame 31 and the arm 112, and pressurized to bias its piston outwardly by a source of air under a constant regulated pressure. The adjusting sprocket 108 is rotatably mounted on an adjusting frame 120 slidably mounted in slots 121 on the plate 107 for movement from a normal position (FIG. 6) with the inner periphery of the adjusting sprocket 108 allowing a portion of the first length of chain 98 between the sprockets 96 and 105 to form a generally straight line; toward the second length of chain 99 to a cut-off position (FIG. 7) so that the adjusting sprocket 108 causes the portion of the length of chain 98 between the sprockets 96 and 105 to form around the sprocket 108 and a portion of the length of chain 99 between the sprockets 106 and 96 (which was previously formed around the sprocket 109) to straighten as the tensioning sprocket 109 moves with the adusting sprocket 108 to maintain a constant tension in the chain 97. Because the sprocket 95 is locked in place by the second disk brake means, such movement causes links in the second length of chain 99 to move toward the first length of chain 98 around the sprocket 96, thereby rotating the tire building wheel 19 a distance dependent on the magnitude of the movement of the adjusting sprocket 108 from its normal position.

Movement of the adjusting sprocket 108 from its normal position is provided by means including a nut 124 mounted on the frame, and a lead screw 125 threadably engaged in the nut 124. The lead screw 125 is rotatably mounted on the frame 31 by a bearing 126 which prevents axial movement thereof, and is coupled by a chain and sprocket assembly 127 to a reversible stepping motor 128 mounted on the frame 31. Rotation of the motor 128 for a predetermined number of revolutions will move the adjusting sprocket 108 a predetermined distance, and the control circuit includes means for pre-setting the number of revolutions which the motor 128 will be operated upon activation thereof.

The severing means for severing the strip material includes means for separating the applying wheel 38 from a tire casing on the tire building wheel 19 by a predetermined amount to provide a short length of unsupported strip material therebetween, and an electrically heated U-shaped blade 130 to melt through said short length of strip material.

The means for separating the applying wheel includes, for each head 13 or 14, a short air cylinder 138 mounted on the head 13 or 14 by a pin 139. The air cylinder 138 is positioned so that as its piston 139 is extended, it will contact a bar fastened between the side plates 152 of the frame portion 35 and rotate the head 13 or 14 through a predetermined angle in a direction to separate the applying wheel 38 from the tire casing 11 on the tire building wheel 19. Such separation provides the aforementioned short length of strip material which extends between the tire casing and the guide shoe 66 (the shoe 66 being clamped against the applying wheel 38 by the control system when the applying head 13 or 14 is separated from the tire casing).

The blade 130 is mounted on a support 131 rotatable about the hub 82 on a bearing (FIG. 5) between a storage position, spaced from the short length of strip material (FIG. 3), and a severing position (FIG. 4) with the blade contacting the short length of strip material. An air cylinder 133 pivotably connected at pins 134 between the support 131 and the frame portion 35 is operable by the control system to provide movement of the blade 130 between its storage and severing positions, and electrical power is supplied to the blade 13 through a pair of flexible electrical cables 136.

OPERATION

The operation of the device 10 to apply parallel strips of reflex-reflective strip material to a tire casing 11 will now be described. Initially the strip applying heads 13 and 14 are in their loading positions. The operator releases the over center device which supports the pivotal wheel sections 25 and 26 of the rim of the tire building wheel 19 by rotating the handle 21. He then positions an unvulcanized tire casing 11 around the tire building wheel 19, repositions the rim section 26 and returns the handle 21 to its locked position to press the section 25 against the section 26 and tension the tire casing 11 about the wheel 19. If necessary, for each strip applying head 13 or 14 the operator threads an end of the strip material 15 from a supply coil placed on the reel 47 along the path defined by the rollers 48 and 49 and between a pair of nipping rollers 51 and 52. At the nipping rollers 51 and 52 a protective liner 46 on the strip material 15 is separated and threaded around the roller 52, under the roller 57 and into the discharge tube 58. The strip material is threaded around the roller 51 and under the roller 61, and a U-shaped supply length of the strip material 15 is positioned in the chamber 63 of a vacuum column 64. The end of the strip material 15 is threaded between the guide shoe 66 and the wheel (which shoe 66 is air biased to clamp the strip against the wheel 38) to project from the shoe 66 so that it will be supported on the periphery of the applying wheel 38 via a vacuum acting through openings 80 in its periphery.

The operator then activates the device 10 by pressing a start button 140 in the control system. The control system releases pressure in the air cylinders 39 to allow the weight of the strip applying heads 13 and 14 to rotate them to their applying position with the applying wheels 38 pressing the ends of the lengths of strip material 15 against the tire casing 11. The control system then allows movement of the shoe 66 to its release position so that the strip material can move between the shoe and the applying wheel 38, and activates the pneumatic clutch 34 to engage the already energized main drive motor 32 with the tire building wheel 19. As the tire building wheel 19 rotates, the strip material 15 is pulled under each of the applying wheels 38. The sensors 74 in each of the vacuum columns 64 provide a signal to cause operation of the associated strip drive motor 53 to propel the strip material toward the vacuum column 64 at a rate sufficient to maintain a supply length in the column 64, thus insuring a minimal tension in the lengths of strip material 15 under the applying wheels 38.

As each strip drive motor 53 drives the strip material 15 via the rollers 51 and 52, slack in the strip material 15 from the nip between the rollers 51 and 52 to the nip between the rollers 51 and 61 and slack in the liner 46 between the rollers 52 and 57 is removed by tension in the supply of lined strip material 46/15 from the reel 47 when the flattened surface portions 78 of the roller 52 are positioned adjacent the rollers 51 and 57.

When the sensor 90 signals that the ends of the strips are being rotated back toward the applying station 12, the control system deactivates the pneumatic clutch 34 and activates the first disk brake mechanism 91 to instantly stop rotation of the tire building wheel 19. The first disk brake mechanism 91 is then released as the second disk brake mechanism 94 is activated. Next the stepping motor 128 is activated for a pre-set number of revolutions so that via the lead screw 125 and nut 124, the adjusting sprocket 108 moves a predetermined distance toward the second length of chain 99 to shorten the same and lengthen the first length of chain 98, thereby rotating the tire building wheel 19 through a predetermined angle. During such movement of the adjusting sprocket 108, the tensioning sprocket 109 moves in the same direction as the adjusting sprocket 108 against the constant bias of the air cylinder 115 to provide a uniform tension in the chain 97.

After the tire building wheel 19 has rotated through the predetermined angle by the motor 128, the control system actuates the air cylinder 76 to move the guide shoe 66 to its clamping position, activates the air cylinder 138 to raise the applying wheels 38 a predetermined distance from the tire casing 11, and activates the air cylinder 133 to rotate the heated blade 130 to its severing position to melt through the predetermined length of strip material between the guide shoe 66 and the tire casing 11. Subsequently the control system operates the motor 128 to return the adjusting sprocket 108 to its normal position, releases the second disk brake mechanism 94, and actuates the cylinders 39 to raise the strip applying heads 13 and 14 to their loading positions so that the operator can operate the handle 21 to remove the striped tire casing from the tire building wheel 19. The device is then in a ready condition with the strip material 15 properly positioned on the paths along the strip applying heads for application thereof to a new tire casing positioned on the tire building wheel 19.

We claim:

1. In a device adapted for adhesively applying lengths of elastic reflex-reflective strip material to tire casings from a supply of the strip material having a protective liner applied thereto, said device comprising means adapted for driving a said tire casing past an applying station; an applying head including a frame, an applying wheel rotatably mounted on said frame, and means for defining a path for said strip material along said frame including a predetermined arcuate path portion relative to said frame defined partially around said applying wheel; liner stripping means for stripping the liner from the strip material along said path in advance of said applying wheel; and means for mounting said applying head at an applying position with said wheel pressing tape along said path portion against the tire casing at said applying station to apply strip material as the tire casing is driven past the applying station, the improvement wherein said device includes:

a vacuum column defining a portion of said path adjacent said applying wheel, said vacuum column having a chamber with open and closed ends adapted for receiving a U-shaped supply length of said strip material through said open end to form a loose fitting air seal between said open and closed ends;

means for providing air under less than atmospheric pressure at the closed end in said chamber to support the U-shaped length therein;

sensing means along said chamber for sensing the position of said U-shaped length of strip material within said chamber;

strip drive means along said path and in driving engagement with said strip material prior to said vacuum column for driving said strip along said path; and control means connected to said sensing and strip drive means and responsive to the position of said U-shaped length of strip material in said vacuum column for operating said strip drive means to maintain a U-shaped supply length of material in said chamber as strip material is applied around a tire casing;

said liner stripping means and said strip drive means comprising:

a first roller having a cylindrical peripheral surface about an axis;

a second roller having cylindrical peripheral surface portions about an axis and at least two flatted peripheral surface portions, said first and second rollers being in an axially parallel relationship with a nip therebetween defining a portion of said path with the liner on the strip material adjacent the second roller, and being spaced to provide driving engagement on opposite surfaces of said lined strip material positioned in said nip when one of said circular peripheral surface portions is at said nip, said flatted peripheral surface portions affording movement of the strip material relative to the periphery of the rollers when one of said flatted peripheral surface portions is at said nip;

means for individually driving said first and second rollers in opposite rotational directions to propel strip material in said nip toward said vacuum column when one of said cylindrical peripheral surface portions is at said nip;

means for pressing the separated strip material into continuous driving engagement with the periphery of said first roller at a position spaced around the periphery thereof from said nip; and an idler roller spaced around the periphery of said second roller from said nip and spaced from said second roller to provide driving engagement with said liner therebetween when one of said circular peripheral surface portions is adjacent said idler roller and to afford movement of the liner relative to said second roller when one of said flatted peripheral surface portions is opposite said idler roller, said flatted peripheral surface portions on said second roller being spaced so that at an adjust position of said second roller during each revolution thereof, one flatted peripheral surface portion is at the nip between said first and second rollers, while the other flatted peripheral surface portion is opposite said idler roller so that the drive means will provide said means for stripping the liner from the strip material when the lined strip material is fed through the nip between the driven first and second rollers with the strip material then extending along the periphery of the first roller to said pressing means and the liner extending along the periphery of the second roller to the idler roller, and any slack accumulated in the strip material and liner on the peripheries of the first and second rollers will be removed by slippage caused from tension in the supply length when said second roller rotates through said adjust position.

2. A device according to claim 1, wherein said means for driving the tire casing moves the tire casing in a path extending around the axis of the tire casing past the applying station; and the device includes sensing means for sensing the applied end of the strip material as it is moved back toward the applying station, means for stopping the movement of the tire casing with said end in a predetermined position relative to said applying station, and means for severing the strip material at a predetermined position relative to the applying head to provide ends on the applied strip material having a predetermined position relationship.

3. A device according to claim 2, wherein said means for driving a said tire casing past the applying station includes support means supporting said tire casing for movement past said applying station, main drive means for driving said support means, first brake means operable for stopping movement of said support means, a second brake assembly comprising a rotatable member and a second brake means for stopping movement of said rotatable member, a chain in driving engagement between said rotatable member and said support means to provide first and second lengths of chain tensioned therebetween, means for lengthening said first length of chain and shortening said second length of chain, and control means for sequentially (1) deactivating said main drive means and operating said first brake means to stop movement of said support means; (2) releasing said first brake means and applying said second brake means to prevent movement of said rotatable member; and (3) operating said means for lengthening said first length of chain by a predetermined amount to move chain from said second length of chain toward said first length of chain about said support means, thereby moving said support means by a predetermined amount and with said first brake means, providing said means for stopping movement of the tire casing with said end in a predetermined position.

4. A device according to claim 1, wherein said applying wheel is formed with openings through tts periphery adapted to communicate with strip material therealong, said device includes means for providing air under less than atmospheric pressure in said openings in the portion of said peripheral surface adjacent said path portion to support said strip material along said path portion, and means for applying an under pressure through said openings in a portion of said peripheral surface spaced from said path portion to clean foreign material from said openings.

5. In a device adapted for adhesively supplying lengths of elastic reflex-reflective strip material to tire casings from a supply of the strip material having a protective liner applied thereto, said device comprising means adapted for driving a said tire casing past an applying station; an applying head including a frame, an applying wheel rotatably mounted on said frame, and means for defining a path for said strip material along said frame including a predetermined arcuate path portion relative to said frame defined partially around said applying wheel; liner stripping means for stripping the liner from the strip material along said path in advance of said applying wheel; and means for mounting said applying head at an applying position with said wheel pressing tape along said path portion against the tire casing at said applying station to apply strip material as the tire casing is driven past the applying station, the improvement wherein said device includes:

supporting means for supporting a supply length of said strip material adjacent said applying wheel under essentially no tension;

sensing means along said path for sensing the position of said supply length of strip material;

strip drive means along said path and in driving engagement with said strip material prior to said supporting means for driving said strip material along said path; and control means connected to said sensing means and said strip drive means and responsive to the position of said supply length of strip material for operating said drive means to maintain said supply length of strip material adjacent said applying wheel as strip material is applied around a tire casing;

said liner stripping means and said strip drive means comprising:

a first roller having a cylindrical peripheral surface about an axis;

a second roller having cylindrical peripheral surface portions about an axis and at least two flatted peripheral surface portions, said first and second rollers being in an axially parallel relationship with a nip therebetween defining a portion of said path with the liner on the strip material adjacent the second roller, and being spaced to provide driving engagement on opposite surfaces of said lined strip material positioned in said nip when one of said circular peripheral surface portions is at said nip, said flatted peripheral surface portions affording movement of the strip material relative to the periphery of the rollers when one of said flatted peripheral surface portions is at said nip;

means for individually driving said first and second rollers in opposite rotational directions to propel strip material in said nip toward said vacuum column when one of said cylindrical peripheral surface portions is at said nip;

means for pressing the separated strip material into continuous driving engagement with the periphery of said first roller at a position spaced around the periphery thereof from said nip; and an idler roller spaced around the periphery of said second roller from said nip and spaced from said second roller to provide driving engagement with said liner therebetween when one of said circular peripheral surface portions is adjacent said idler roller and to afford movement of the liner relative to said second roller when one of said flatted peripheral surface portions is opposite said idler roller, said flatted peripheral surface portions on said second roller being spaced so that at an adjust position of said second roller during each revolution thereof, one flatted peripheral surface portion is at the nip between said first and second rollers, while the other flatted peripheral surface portion is opposite said idler roller so that the drive means will provide said means for stripping the liner from the strip material when the lined strip material is fed through the nip between the driven first and second rollers with the strip material then extending along the periphery of the first roller to said pressing means and the liner extending along the periphery of the second roller to the idler roller, and any slack accumulated in the strip material and liner on the peripheries of the first and second rollers will be removed by slippage caused from tension in the supply length when said second roller rotates through said adjust position.

6. A device according to claim 5, wherein said means for driving the tire casing moves the tire casing in a path extending around the axis of the tire casing past the applying station; and the device includes sensing means for sensing the applied end of the strip material as it is moved back toward the applying station, means for stopping the movement of the tire casing with said end in a predetermined position relative to said applying station, and means for severing the strip material at a predetermined position relative to the applying head to provide ends on the applied strip material having a predetermined position relationship.

7. A device according to claim 5, wherein said means for driving a said tire casing past the applying station includes support means supporting said tire casing for movement past said applying station, main drive means for driving said support means, first brake means operable for stopping movement of said support means, a second brake assembly comprising a rotatable member and a second brake means for stopping movement of said rotatable member, a chain in driving engagement between said rotatable member and said support means to provide first and second lengths of chain tensioned therebetween, means for lengthening said first length of chain and shortening said second length of chain, and control means for sequentially (1) deactivating said main drive means and operating said first brake means to stop movement of said support means; (2) releasing said first brake means and applying said second brake means to prevent movement of said rotatable member; and (3) operating said means for lengthening said first length of chain by a predetermined amount to move chain from said second length of chain toward first length of chain about said support means, thereby moving said support means by a predetermined amount and with said frist brake means, providing said means for stopping movement of the tire casing with said end in a predetermined position.

8. A device according to claim 5, wherein said applying wheel is formed with openings through its periphery adapted to communicate with strip material therealong, said device includes means for providing air under less than atmospheric pressure in said openings in the portion of said peripheral surface adjacent said path portion to support said strip material along said path portion, and means for applying an under pressure through said openings in a portion of said peripheral surface spaced from said path portion to clean foreign material from said openings.

9. A device according to claim 5, wherein said device includes two applying heads each of the type defined in claim 6, and said means for mounting said head mounts each of said heads (1) for individual pivotal movement about a pivot axis between a loading position with its applying wheel spaced from said applying station, and an applying position with its applying wheel positioned to press a strip of material into engagement with a tire casing at said applying station, and (2) for independent adjustable movement axially of said pivot axis.

10. A device according to claim 9, wherein said head mounting means comprises a shaft rotatably mounted about said pivot axis, means for mounting one of said heads for pivotal movement about and relative to said shaft at a position fixed along the axis thereof, means for mounting the other of said heads on said shaft for axial movement relative thereto, means for manually adjusting the axial spacing of said heads along said shaft, and means for manually adjusting the axial position of said shaft relative to said means for driving a said tire casing past said applying station.

* * * * *

UNITED STATES PATENT OFFICE
CERTIFICATE OF CORRECTION

PATENT NO. : 3,899,383
DATED : August 12, 1975
INVENTOR(S) : Thomas E. Schultz and Peter W. Schuchardt It is certified that error appears in the above-identified patent and that said Letters Patent are hereby corrected as shown below:

Column 6, line 60, after "66" insert -- and --.

Column 8, line 37, after "and" insert -- is --.

In the Claims

Column 13, line 8, changs "tts" to -- its --.

Column 14, line 53, change "claim 5" to -- claim 6 --.

Column 15, line 6, after "toward" insert -- said --; and line 9, change "frist" to -- first --.

Column 16, line 3, change "claim 6" to -- claim 5 --.

Signed and Sealed this second Day of December 1975

[SEAL]

Attest:

RUTH C. MASON
Attesting Officer

C. MARSHALL DANN
Commissioner of Patents and Trademarks